United States Patent Office 3,483,105
Patented Dec. 9, 1969

3,483,105
HIGHLY RADIATION-SENSITIVE TELOMERIZED POLYAMIDES
Gaetano F. D'Alelio, South Bend, Ind., assignor, by mesne assignments, to PPG Industries, Inc., a corporation of Pennsylvania
No Drawing. Filed May 18, 1966, Ser. No. 550,971,
Int. Cl. B01j *1/10;* C08d *1/00;* C08f *1/16*
U.S. Cl. 204—159.15                24 Claims

ABSTRACT OF THE DISCLOSURE

The preparation of highly radiation-sensitive telomerized diacrylyl polyamides whereby said polyamides are treated by subjecting same to high energy ionizing radiation so as to produce three-dimensional crosslinked, insoluble infusible polymers at relatively low doses of ionizing radiation.

---

This invention in general deals with radiation-sensitive polymers. Particularly it concerns viscous or solid, soluble, fusible, relatively low molecular weight polymers, referred to as oligomers, which, when subjected to ionizing radiation become insoluble and infusible. More specifically, it deals with telomerized polyamides which, on irradiation, convert to three-dimensional crosslinked, insoluble, infusible polymers at relatively low doses of ionizing irradiation.

The telomerized polyamides of this invention are linear polyamides which are derived from the condensation of a glycidyl acrylate with a linear condensation polymer of unsaturated aliphatic, including cycloaliphatic polycarboxylic acids with saturated or unsaturated aliphatic, including cycloaliphatic, diamines, or aminoalcohols. These telomerized polyamides have as end groups the highly radiation-sensitive acryloxy group having the formula

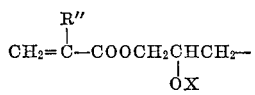

The term "polyamides" is used generically herein to include amide-ester copolymers as well as polymers in which substantially all the condensation groups are amide groups.

Accordingly these radiation-sensitive telomerized polyamides have the formula

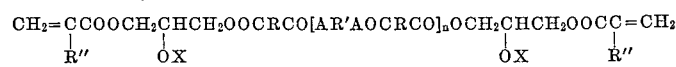

wherein $n$ represents a numerical value of 1 to 14; A represents —O— or —NH— but at least one A group per molecule represents —NH—, and preferably at least 50% of the A groups represents —NH—; R represents a divalent aliphatic (including cycloaliphatic) hydrocarbon radical having 2–10 carbon atoms with at least 75% of said R groups per polyamide molecule being unsaturated; R' represents a divalent aliphatic hydrocarbon radical (saturated or unsaturated and including cycloaliphatic) containing 2–10 carbon atoms; R" represents hydrogen or $CH_3$; R'''' represents hydrogen or an aliphatic hydrocarbon radical of 1–18 carbon atoms; and X represents hydrogen or an acyl group of the formula R''''CO. The radical —OCRCO— can be defined as the dicarboxylic radical derived from an unsaturated aliphatic dicarboxylic acid such as maleic, fumaric, itaconic, citraconic, mesaconic, etc.

These highly radiation-sensitive telomerized polyamides are prepared from appropriate acrylyl derivatives such as the glycidyl esters,

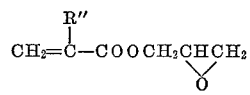

by reaction with carboxyl terminated unsaturated aliphatic polyamides. In these cases, the glycidyl acrylate which is a derivative of the trihydric glycerine yields linear ester-amides containing one free unreacted hydroxyl group.

The carboxyl terminated unsaturated aliphatic polyamides are derived by the reaction of the above-mentioned unsaturated aliphatic dicarboxylic acids with a diamine, an alkanolamine, a mixture of a diamine and a glycol, or mixture of an alkanolamine and a glycol. These diamines, alkanolamines and glycols can be represented by the formulas $NH_2R''NH_2$, $NH_2R'OH$ and $HOR'OH$ respectively. While the —NH— group is preferred as the connecting amide group, it is considered equivalent for most purposes of this invention to use —NR'— with R' as defined above. The corresponding alkylene imines,

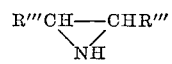

can, when available, also be used, wherein R''' is H or an alkyl group having 1–10 carbon atoms.

In view of the reactivity of amines with the unsaturation in acrylic acid and in the unsaturated dicarboxylic acid, precautions should be taken to avoid or to minimize this side reaction. The addition of amines to ethylenic or unsaturated groups is retarded by suspending the reagents in a hydrocarbon solvent such as xylene, benzene, toluene, naptha, cyclohexane, octane, etc. The hydrocarbon is advantageously removed when it is no longer needed for this purpose. The amine addition to the unsaturated group can also be avoided by using acid chlorides of the dicarboxylic acids for reaction with amines to form the polyamides.

Thus a dicarboxyl terminated unsaturated aliphatic polyamide can be reacted with glycidyl acrylate to produce linear hydroxyl substituted radiation sensitive polyamides, thus

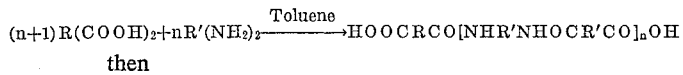

then

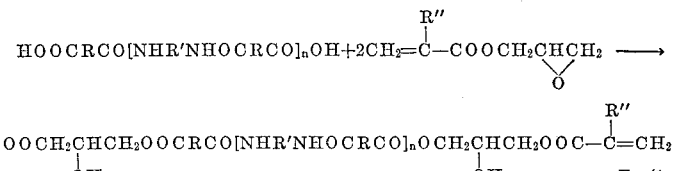

Eq.(1)

When an alkanolamine, or a mixture of a diamine and either an alkanolamine or a glycol, is used in place of the diamine in the above reaction the product is similar to that of Equation 1 except some of the —NH— radicals have been replaced by —O— radicals.

Telemerized polyamides with a greater number of repeating segments, and therefore of higher molecular weight than the simplest polyamides, are prepared by increasing the ratio of the $n$ moles of diamine, etc. and the $n+1$ moles of dicarboxylic acid to the 2 moles of glycidyl acrylate to maintain the molar ratio of diamine, etc.:diacid:glycidyl acrylate at $n:(n+1):2$. Thus it may be seen that the simplest polyamide is obtained with one mole of diamine; two moles of diacid and two moles of glycidyl acrylate. When the value of $n$ is increased for the diamine to 2, the value for the diacid becomes 3 and that for the acrylic function remains constant at 2.

The linear polyamides can be prepared by various types of standard reactions used in preparing amides starting with unsaturated acids or their anhydrides or acid halides and diamines, etc., or alkylene imines. The conditions used are those appropriate for the normal reactions of amines with unsaturated acids, anhydrides and acid halides to form amides, and also those normally used for the reaction of the glycidyl group with acids.

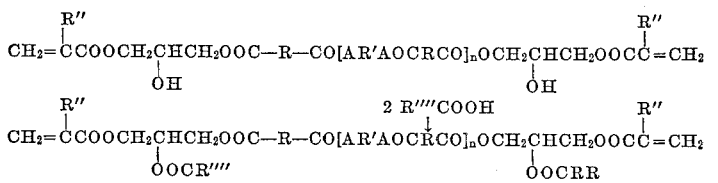

The hydroxy substituted acrylyl terminated polymer amides as represented broadly by the above formulas have specific and improved utility especially when polymerized in the presence of cellulose such as wood, paper, fibers, fiber board, etc., in the form of a coating, impregnant or bonding agent. The presence of the alcoholic hydroxyl causes improved wetting of cellulose and because of hydrogen bonding of the hydroxyl group with the cellulose, yields improved adhesion compared to the unsubstituted oligomeric polyamides.

In those cases where the presence of these hydroxyl groups is not desired or is detrimental to such properties as dielectric constant or power factor, the hydroxyl groups can be converted to ester groups by acylation with aliphatic acids, R''''COOH wherein R'''' is H or an aliphatic saturated or unsaturated hydrocarbon group containing 1 to 18 carbon atoms, such as formic, acetic, propionic, butyric, acrylic, methacrylic, oleic, stearic acid, etc., or their anhydrides forming a class of polyamides suitable in the practice of this invention, thus:

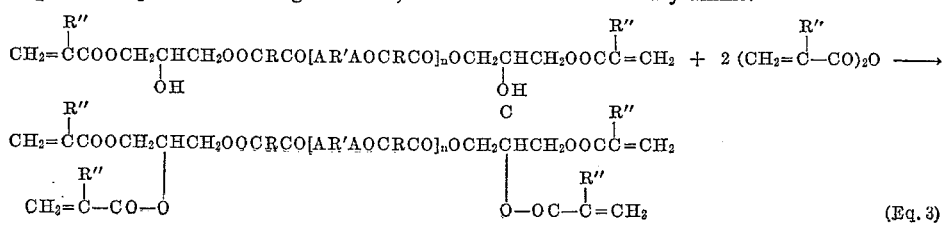

(Eq. 2)

The radiation sensitive oligomeric polymers of Equation 2 are particularly useful especially when admixed with polyamides; such as nylon, or unsaturated polymeric alkyd esters such as polyethylene maleate, polyethylene fumarate, etc.

Acrylation of the hydroxyl substituted telomerized polyamide of Equation 1 by means of an acrylic acid, or its acrylic anhydride or chloride produces a class of telomerized radiation-sensitive polymers which, because of the increased number of acrylyl groups, shows an even more improved response to ionizing radiation, thus

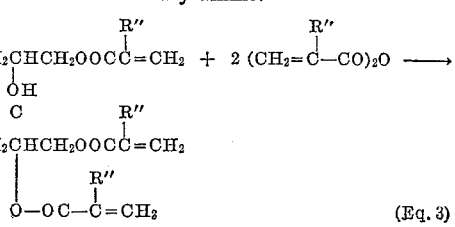

In the above formulas the derivatives of the glycidyl acrylate component are represented by the structure

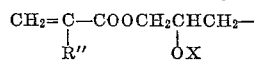

However it is recognized that the oxirane ring of the glycidyl group may react so that the isomeric structure,

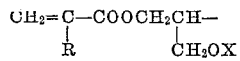

may be formed. It is intended that both of these isomeric structures are covered by the various formulas given herein.

As previously pointed out, the use of the hydrocarbon suspension medium to eliminate or retard amine addition to the unsaturated group during amidification can be avoided by using the unsaturated dicarboxylic acid in its halide form, for example:

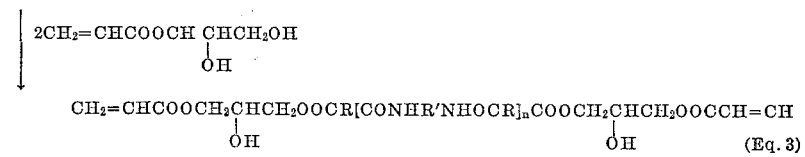

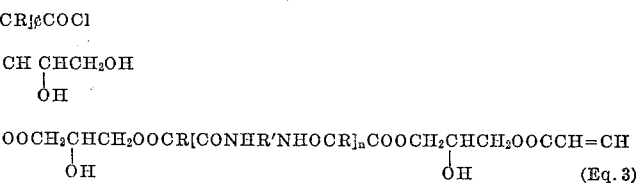 (Eq. 3)

Depending on the nature of R, R' and R'' the viscosity of these telomerized polyamides increases from about 300 to 50,000 centistokes at 20° C. as the value of $n$ increases from 1 to 14. Also depending on the values of $n$ R' and R'', the molecular weight of these telomerized amides will vary from about 275 for the lowest one at a value of $n=1$ to about 8800 for $n$ equal to 14 when the diacid is decenedicarboxylic acid and the diamine is dodecanediamine.

In cases where it is desirable to have predominately amide mixtures in the polymer, the center portion of the polymer can be made entirely by the reaction of a diamine with the dicarboxylic acid, using a hydrocarbon medium or the acid chloride form of the acid in order to avoid amine addition to the unsaturated groups, and using proportions to give terminal carboxylic groups. Then the preparation of the telomerized polymer can be completed by using glycidyl acrylate in cases where the terminal carboxylic groups are free acid groups, and using glyceryl monoacrylate when the terminal carboxylic groups are acid chloride groups.

As previously pointed out the use of the hydrocarbon medium for conducting the condensation reaction of the carboxylic acid and amine groups avoids addition of the amine to the unsaturated groups. When the acid chloride or other halide is used, the halide has such a great affinity for the amine group that the amidification is effected in preference to any amine addition to the unsaturated groups. When an acid halide is used, it is generally desirable to use a hydrogen halide-acceptor such as a tertiary amine.

(Eq. 3)

Typical examples of the various NH₂R'NH₂ diamines that can be used in synthesizing the telomerized polyamides of this invention are ethylene diamine, tetramethylene diamine, 2,3-diaminobutane, 1,4-diaminobutane, 1,4-diamino-2-ethylbutane, 1,6-diaminohexane, 1,8-diamino octane, 2,10-diaminodecane, 1,4-diaminocyclohexane, 1,4-bis-(aminomethyl)cyclohexane, 1,3-diaminocycloheptane, 2,2 - diethyl - propanediamine-1,3, 2,2-dimethylpropanediamine-1,3, 3-methylpentanediamine-1,4, 2-diethylbutanediamine-1,3, 4,5-diamino-nonane, pentamethylene diamine, heptamethylene diamine, nonamethylene diamine, decamethylene diamine, diethylene triamine, triethylene tetraamine, propylene diamine, dipropylene diamine, 2-ethylhexanediamine-1,3, 1,4-diamine diamino butene-2, 1,4-diamino-cyclohexene-2, 8-diamino-octene-4, etc. Alkylene imines can also be used to give corresponding diamine derivatives, such as propylene imine, ethylene imine, 2,3-butylene imine, etc. While amines such as diethylene triamine, etc., have an intermediate amino group between the terminal amine groups, they are considered equivalent to the diamines listed above for the purpose of this invention.

Typical examples of various alkanolamines that can be used in synthesizing telomerized polymeric amide-esters of this invention, are: ethanolamine, propanolamine, butanolamine, hexanolamines, decanolamines, etc., such as 2-aminoethanol, 2-aminopropanol-1, 3-aminopropanol-1, 3-aminopropanol-2,4, 4-aminobutanol-1, 3-aminobutanol-2, 4-aminopentanol-1, 6-aminohexanol-1, 7-aminooctanol-2, 9-aminodecanol-2, 10-aminodecanol-1, 1-amino-8-hydroxy-decene-5, 1-amino-4-hydroxy-butene-2, 1-amino-4-hydroxy-cyclohexene-2, etc.

Some illustrative examples of the various HO—R'—OH alcohols which can be used in synthesizing telomerized polymeric amide-esters of this invention are ethylene glycol, trimethylene glycol, tetramethylene glycol, 2,3-dihydroxybutane, 1,4-dihydroxybutane, 1,4-dihydroxy-2-ethylbutane, 1,6-dihydroxyhexane, 1,8-dihydroxyoctane, 2,10-dihydroxydecane, 1,4-dihydroxycyclohexane, 1,4-dimethylolcyclohexane, 2,2-diethyl-propanediol-1,3, 2,2-dimethyl-propanediol-1,3, 3-methylpentanediol-1,4, 2,2-diethylbutanediol-1,3, 4,5-dihydroxynonane, pentamethylene glycol, heptamethylene glycol, nonamethylene glycol, decamethylene glycol, diethylene glycol, triethylene glycol, propylene glycol, dipropylene glycol, butene-2-diol-1,4, 2,7 - dihydroxy-n-hexene-4, 2,7-dihydroxy-2,7-dimethyl-n-hexene-4, 2-ethylhexanediol-1,3, etc. Alkylene oxides can also be used to give corresponding glycol derivatives, such as propylene oxide, ethylene oxide, 2,3-butylene oxide, etc.

Some illustrative examples of the various

HOOC—R—COOH acids which can be used in preparing the telomerized polyamides of this invention are maleic, fumaric, itaconic, citraconic, mesaconic, acetylene dicarboxylic, aconitic, alpha-methyl-itaconic, alpha-alpha-dimethyl-1,2-tetrahydrophthalic, 1,3-tetrahydrophthalic, 1,4-tetrahydrophthalic, trans-1,4-cyclohexenecarboxylic acids, etc. For the purpose of this invention, 70 percent or more of the repeating unit segments derived from dicarboxylic acid should be of the unsaturated type. The remaining dicarboxylic acid segments can be of the saturated aliphatic type.

It is most important to note that the various classes of telomerized polyamides of this invention contain aliphatic hydrocarbon structures in their polycarboxylic acid and amino or alcohol segments. It is because of this aliphatic character that these telomerized polyamides are highly responsive to ionizing radiation, and in fact, substitution of any of the aliphatic polycarboxylic acids by aromatic carboxylic acids or substitution of the aliphatic amino or alcohol components by aromatic amino or alcohol compounds, decreases the response to ionizing irradiation to such a point that they are not economically feasible.

As an example, the dimethacrylyl telomerized polyethylene maleamide,

crosslinks at about 3 megarads, whereas the corresponding phthalyl derivative,

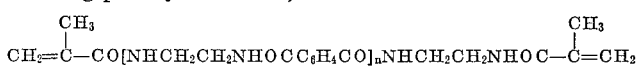

requires 16 megarads to make it insoluble and infusible.

This difference is surprising particularly because these telomerized amides all cure with radical initiators such as with 1% benzoyl peroxide in about 90 to 95 seconds at 100° C., and with redox systems of cobalt acetate and tertiary butyl hydroperoxide in three to three and one-half hours at room temperature. This difference is due apparently to the fact that aromatic ring compounds such as phenyl, naphthyl and the like are energy sinks for irradiation.

It will be noted too that the aliphatic hydrocarbon structures in the polycarboxylic segments are unsaturated. This is for the purpose of imparting rigidity to the irradiated products. While the unsaturation in the acrylyl groups at the ends of the telomerized diacryl polyamides is more easily available for crosslinking and insures more immediate and more easily attained crosslinking, the unsaturation provided along the linear chain of the telomerized polyamide by virtue of the unsaturation in the unsaturated dicarboxylic acid groups permits a greater number of crosslinkages in a polymer molecule and thereby imparts a more rigid character to the resultant irradiated polyamide.

The telomerized polyamides of this invention are particularly useful for blending with various types of polyamides, particularly those which are not easily crosslinked by radiation or which require such a high degree of radiation for crosslinking as to be accompanied by decomposition, degradation, or discoloration. Where the telomerized polyamide of this invention is blended with a polyamide substance such as a nylon or polycaprolactamide, the similarity in the structure of the polyamide of this invention with the structure of the polyamide to which it is being added facilitates the blending and makes it more compatible therewith, resulting in less destruction of or detraction from the properties of the original polymer. This permits a blending of a crosslinking agent of improved compatibility and permits subsequent crosslinking by radiation without any disruption of or detraction from the basic properties of the original polymer. Consequently, the improvements effected by crosslinking are not offset in any manner by the presence of incompatible groups or groups which are less stable or have properties different from those of the amide groups of the base polymer.

In view of the fact that the radiation dosage previously required to effect any degree of crosslinking with most polymers was so high as to be accompanied by degradation of the polymer, particularly with nylon, it is particularly important that blending with the telomerized polyamides of this invention permits crosslinking of nylon and other aliphatic polymers to be effected at very low radiation dosages, as described more fully hereinafter, and thereby avoid degradation of the polymer.

While the telomerized polyamides of this invention have a particular utility with polyamide resins such as nylon and polycaprolactamide, they can be used with various other types of polymers, such as polyesters, both saturated and unsaturated, including maleic-ethylene glycol, phthalic-ethylene glycol, polyvinylacetate, methylmethacrylate, polyvinylchloride types, etc.

Where these telomerized polyamides are to be used with polyester types of resins, it is often desirable that the mixed amide-ester type of crosslinking agents of this invention be used. Likewise, when mixtures of polyamide and polyester resins are being blended for subsequent radiation, it is desirable to use the mixed types of amide-esters of this invention.

The term "irradiation," as used herein, means high energy radiation and/or the secondary energies resulting from conversion of this electron or other particle energy to neutron or gamma radiation, said energies being at least equivalent to about 100,000 electron volts. While various types of irradiation are suitable for this purpose, such as X-ray and gamma and beta rays, the radiation produced by accelerated high energy electrons has been found to be very conveniently and economically applicable and to give very satisfactory results. However, regardless of the type of irradiation and the type of equipment used for its generation or application, the use thereof in the practice of the invention as described herein is contemplated as falling within the scope of this invention so long as the ionization radiation is equivalent to about 100,000 electron volts.

While there is no upper limit to the electron energy that can be so applied advantageously, the effects desired in the practice of this invention can be accomplished without having to go above about 20,000,000 electron volts. Generally, the higher the electron energy used, the greater is the depth of penetration into the massive structure of the materials to be treated, and the shorter is the time of exposure required to accomplish the desired result. For other types of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graaff generators, betatrons, synchrotons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example, Cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Massachusetts, or other types of accelerators as described in United States Patent No. 2,763,609 and in British Patent 762,953 are satisfactory for the practice of this invention.

In the following examples, the radiation doses are reported in megarads, which represent 1,000,000 rads. A "rad" is defined as the unit of absorbed dose and is equal to 100 ergs per gram.

Many monomers as well as polymers have been subjected to ionizing radiation to convert them to improved or modified products. However, irradiation processes have been primarily of scientific interest, and very little use of such irradiated polymer processes have been made industrially. This is primarily due to economic factors because of the cost of the ionizing radiation delivered to the system to be treated. For example, the well-known low-cost polyester systems which consist of a mixture of about equal parts by weight of styrene monomer and an unsaturated alkyl resin prepared from maleic or fumaric anhydride, phthalic anhydride and ethylene glycol or diethylene glycol can be more economically polymerized by free radical initiators than by ionizing radiation which requires about 25 to 40 megarads, depending on the formulation.

Such systems can be improved somewhat, however, by elimination of phthalic anhydride in the formulation of the polyester and substituting the higher cost monomeric acrylic esters for the styrene. Even in such systems, the economic factors are unfavorable not only because of the much higher cost of the mixture but because of the high volatility of the acrylic or methacrylic esters used. Even in such cases the irradiation dose required is of the order of 18 to 20 megarads and the systems are highly inhibited by oxygen. The addition of substances such as acetone or methyl ethyl ketone can reduce the required dose to 9 to 12 megarads. Even then the products possess the undesirable odor of unpolymerized acrylic monomer.

In contrast, by the use of the acrylyl telomerized polyesters used in the practice of this invention and described hereinabove, crosslinked, insoluble, infusible polymers can be prepared readily by subjecting the polyesters to ionizing radiation in doses of less than 10 megarads and in some cases to doses of 0.5 magarad or less, generally preferably at least about 1 megarad. Irradiation dosages in this range are economical.

Furthermore, the acrylyl components in these telomerized polyamides are located at the ends of the polyamide chains where they can more effectively crosslink. More important, the acrylyl components comprise a minor portion of the composition, and are particularly economical when the value of $n$ in these telomerized polyamides as at least 2. In addition, because the molecular weight of the telomerized polyamide is much higher than a corresponding simple monomer such as methyl methacrylate or ethyl acrylate, it can function in a single molecule both as monomer and as polymer.

This property of crosslinking at economical radiation doses is maintained when these telomerized polyamides are admixed with polyamide resins, such as nylon, or with unsaturated alkyd resins alone or in the presence of other polymers provided the polyamide resin, unsaturated alkyd resin and other polymers are of the non-aromatic type, that is, they are free of aromatic rings which act as energy sinks and retard the crosslinking reaction. One of the advantages of these diacrylyl polyamides is their compatibility with various types of resins particularly polyamide or alkyd types.

A few illustrative examples of suitable polymers which may be dissolved in or mixed with the telomerized polyamides of this invention along with the unsaturated alkyd resins are the non-aromatic type polymers such as nylon 66 (polyhexamethylene adipamide), polycaprolactam, polyvinyl acetate, polyethyl acrylate, polymethyl methacrylate, cellulose acetate, cellubutyrate, ethyl cellulose, polyethylene adipate, polyethylene azeleate, polydecamethylene succinate, polydecamethylene sebacate, etc. The lower telomerized polyamides are also compatible with polyvinyl chloride particularly upon the application of moderate heat.

The telomerized polyamides of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or non-volatile solvents of a non-aromatic nature best suited to the particular application. The products resulting from the irradiation of the telomerized polyamides of this invention can vary from soft flexible bodies too hard rigid masses.

The telomerized radiation-sensitive polyamides of this invention are particularly useful in the preparation of copolymers with unsaturated alkyd resins. In carrying this portion of the invention into effect, an esterification product of a polyhydric alcohol and an alpha, beta, unsaturated polycarboxylic acid is first prepared in accordance with techniques now well known to those skilled in the alkyd resin art.

Any aliphatic polyhydric alcohol containing at least two esterifiable aliphatic hydroxy groups, or mixtures of such alcohols, can be used in preparing the unsaturated alkyd resins. Examples of such polyhydric alcohols are ethylene glycol, di-, tri-, and tetra-ethylene glycols, thiodiglycol, glycerine, pentaerythritol, 1,4-dihydroxy-butene-2, dimethylol cyclohexane, dihydroxycyclohexane, etc. Any non-aromatic alpha-unsaturated, alpha, beta-polycarboxylic acid, or mixtures of such acids, can be reacted with the polyhydric alcohol or alcohols to form the unsaturated alkyd resin. Examples of such polycarboxylic acids are maleic, fumaric, citraconic, mesaconic, acetylene dicarboxylic, aconitic, cyclohexene dicarboxylic, etc., itaconic and its homologues, as, for instance, alpha methyl itaconic acid, alpha, alpha-dimethyl itaconic acid, etc. Anhydrides of these polycarboxylic acids can also be employed.

In some cases, instead of using an unmodified, unsaturated alkyd resin, an unsaturated alkyd resin can be used which has been internally modified by replacing a part, say up to about 75 mole percent, of the unsaturated polycarboxylic acid with saturated aliphatic polycarboxylic acids, such as succinic, adipic, glutaric, pimelic, sebacic, azelaic, suberic, tricarballylic, etc.

Anhydrides of these acids, if available, can also be used. The term "polycarboxylic acid" as used generally herein is intended to include the anhydrides of the acids.

The esterification products of polyhydric alcohols with ethylenic polycarboxylic acids, or with aliphatic polycarboxylic acids, can be further modified by introducing as a reactant in the preparation of the alkyd resin, a monoesterifiable compound or compounds, more particularly a saturated or unsaturated normal or isomeric monohydric alcohol, or mixture thereof, a saturated or unsaturated monocarboxylic acid, or mixture thereof, or both such esterifiable monohydroxy organic compounds as well as by the use of hydroacids.

Examples of non-aromatic monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, cyclohexyl, cyclopentyl, etc. The use of methyl and ethyl alcohol is not precluded, but in general these alcohols are less satisfactory because of their lower boiling points. As monobasic acids there can be used, for example, the unsubstituted saturated and unsaturated normal or isomeric monocarboxylic acids containing only one esterifiable group, such as acetic propionic, butyric to stearic, inclusive, hexahydrobenzoic, hexahydrotoluic, furoic acids, etc.

The monoesterifiable compounds can be introduced into the esterification before, during, or after the esterification of the polyhydric alcohol with the polycarboxylic acid under conditions that promote interesterification of the monoesterifiable compound with the incompletely esterified polyhydric alcohol-polycarboxylic acid product. That is, the monoesterifiable compound is introduced into the reaction mass before all of the acid groups of the polyhydric acid, or all of the alcohol groups of the polyhydric alcohol have been esterified.

The term "unsaturated non-aromatic alkyd resins," as used generally herein and in the appended claims, is intended to include within its meaning both unmodified esterification products of a non-aromatic polyhydric alcohol with a non-aromatic alpha-unsaturated, alpha, beta-polycarboxylic acid and esterification products of these components which have been modified, for example, as briefly described hereinabove. An alternate term is "unsaturated aliphatic alkyd resins" (including cycloaliphatic types).

To achieve copolymerization of the unsaturated alkyd resin with the telomerized polyesters of this invention, a solution or mixture of the unsaturated alkyd resin in the telomerized polyesters is first effected. Copolymerization of the components of the mixture is achieved rapidly and advantageously by ionizing radiation, such as by atomic radiation from a reactor, or from Cobalt 60, or by means of high energy electrons generated by an electron linear accelerator.

Typical examples of unsaturated alkyd resins are:

Alkyd resin A—Ethylene glycol itaconate

| | Parts by wt. |
|---|---|
| Ethylene glycol | 23 |
| Itaconic acid | 52 |

The components are mixed and slowly heated in the course of one hour from room temperature to 190° C., in an inert nitrogen atmosphere, and held at this temperature for three to five hours.

Alkyd resin B—Ethylene glycol maleate

| | Parts by wt. |
|---|---|
| Ethylene glycol | 31 |
| Maleic anhydride | 32 |

The compounds are mixed and heated as in the preparation of alkyd resin A to 180° C., and held at that temperature for four to six hours.

Alkyd resin C—Acetic acid-modified diethylene glycol maleate

| | Parts by wt. |
|---|---|
| Diethylene glycol | 106 |
| Maleic anhydride | 88 |
| Acetic anhydride | 10 |

The ingredients are mixed together and refluxed for one hour in an inert nitrogen atmosphere after which the reaction mixture is brought to 190° C., which temperature is maintained for four to six hours.

It will be understood, of course, that this invention is not limited to the use of the specific unsaturated alkyd resins mentioned above and that a broad modification of the nature of the copolymer is possible by using other unsaturated aliphatic alkyd resins or mixtures of such resins. As illustrative examples of other unsaturated alkyd resins, the following esterification products can be used, as illustrated in alkyd resins D to I. Aromatic alkyd resin J is included for comparison.

Alkyd resin:    Components (parts)
D _____ Diethylene glycol (160).
               Maleic anhydride (147).

E _____ Diethylene glycol (106).
               Itaconic acid (130).

F _____ Glycerine (18.4).
               Itaconic acid (39.0).

G _____ Ethylene glycol (6.0).
               Maleic anhydride (19.6).
               Hydroxypropyl acrylate (26.0).

H _____ Ethylene glycol (20).
               Maleic anhydride (29.4).
               Succinic acid (3.3).

I _____ Diethylene glycol (30.6).
               Maleic anhydride (17.6).
               Itaconic acid (15.6).

J _____ Diethylene glycol (30.3).
               Maleic anhydride (13.2).
               Phthalic anhydride (21.7).

In many cases, instead of polymerizing a single telomerized polyester with a single unsaturated alkyd resin, mixtures can be used of two or more telomerized polyesters with a single unsaturated aliphatic alkyd resin, or a single telomerized polyester with two or more unsaturated aliphatic alkyd resins, or a mixture of two or more telomerized polyesters with two or more unsaturated aliphatic alkyd resins. In conjunction with the alkyd resins, comonomers can be used which are copolymerizable with the telomerized polyamide or with the unsaturated alkyd resins, or with both, for example, one or more telomerized polyamides can be used with one or more unsaturated aliphatic alkyd resins together with methyl methacrylate.

In addition to, or in lieu of the methyl methacrylate, other comonomers or mixture of comonomers can be used, for example, the vinyl esters, that is vinylacetate, and the vinyl esters of saturated and unsaturated, and aliphatic, monobasic and polybasic acids, and more specifically the vinyl esters of the following acids: propionic, isobutyric, valeric, caprylic, capric, oleic, stearic, acrylic, methacrylic, crotonic, oxalic, malonic, succinic, glutaric, adipic, suberic, azelaic, maleic, fumaric, itaconic, mesaconic, hexahydrobenzoic, citric trimesic etc., as well as the corresponding allyl, methallyl, etc. esters of the aforementioned acids.

Other suitable comonomers are the acrylic and alkacrylic acids and their derivatives, such as their esters, amides and corresponding nitriles, for example, acrylic acid, methyl acrylate, butyl acrylate, allyl acrylate, ethylene glycol diacrylate, acrylonitrile, methacrylonitrile, methacrylic acid, methyl methacrylate, hydroxypropyl methacrylate, etc.; the itaconic acid monoesters and diesters, such as the methyl, ethyl, allyl, dimethallyl, the maleic and fumaric acid monoesters, diesters and their amide and nitrile compounds, such as, ethyl allyl maleate, fumaryl dinitrile, dimethallyl fumarate, etc.; the ethers, such as methallyl allyl ether, vinyl allyl ether, vinyl methallyl ether, allyl crotyl ether, vinyl crotyl ether; cyanuric acid derivatives such as diallyl cyanurate, triallyl cyanurate, trivinyl cyanurate, or in general, triazine compounds having at least one polymerizable or copolymerizable unsaturated group attached directly or indirectly to the triazine ring, as well as the partial, soluble or fusible polymers of the hereinabove listed monomers, etc.

The modified unsaturated aliphatic alkyd resins of this invention can be used alone or with fillers, dyes, pigments, opacifiers, lubricants, plasticizers, natural and synthetic resins or other modifying bodies in, for example casting, molding, laminating coating applications, and as adhesives, impregnants, and protective coatings.

In coating, impregnating and similar applications, the mixed monomeric or partially copolymerized materials, without added solvent can be applied to the object to be treated and polymerized, with or without the application of heat and pressure, to form the final insoluble polymeric composition in situ. These new synthetic materials can be used as impregnants for many porous bodies, such as cork, pottery, felts, or fabricated bodies with interstices, such as the windings of electrical coils, netted fibers, interwoven fibrous cotton or glass materials, etc. They can also be used for the production of wire coatings and winding tapes, and for protectively coating impervious articles, such as metals, or for coating and impregnating articles such as paper, wood, cloth, glass fibers in felted, woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions. Also, these new mixtures comprising at least one telomerized polyamide of this invention and at least one unsaturated aliphatic alkyd resin, with or without modifying agents, can be cast under pressure while being irradiated.

In preparing the interpolymerization products of the unsaturated aliphatic alkyd resin and the telomerized polyamide, the unsaturated alkyd resin can constitute as much as 98 or 99 percent by weight of the whole. In other cases the telomerized polyamide alone, or admixed with aliphatic comonomers or modifiers, can constitute as 98 to 99 percent by weight of the whole.

In general, the proportions of the components used in a particular formulation will depend upon the particular properties desired in the interpolymer. For most applications, it is preferred to use 30 to 90 percent of the unsaturated aliphatic alkyd resin and from 10 to 70 percent of the telomerized polyamide, since within these ranges interpolymers best adapted for most commercial applications can be produced.

Within these ranges the new interpolymers have a wide range of properties. For example, depending upon the particular telomerized polyamide or mixture of telomerized polyamides used with the particular unsaturated aliphatic alkyd resin the particular proportions thereof, the conditions of polymerization, such as the temperature, pressure, presence or absence of additives, etc., the irradiation dose, and the extent of polymerization, they can vary in the degree of hardness, rigidity and resistance to solvents.

In the intermediate stages of copolymerization, some form fluid compositions of varying viscosities and may be so used. For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acids, bases, salts, solvents, swelling agents, and the like.

When it is desired to modify the properties of the polymers of the telomerized polyamides of this invention, this can be accomplished by copolymerizing a mixture comprising at least one telomerized polyamide with at least one copolymerizable unsaturated ethylenic, or acetylenic hydrocarbon, radical, more particularly, a

radical, such as vinyl, allyl, methallyl, vinylidene, etc., or with a copolymerizable compound containing a $$-CH=CH<$$

or a $$-CH=C\diagup_\diagdown, \text{ or a } \diagdown_\diagup C=C\diagup_\diagdown$$

grouping, for example, as in vinylidene fluoride, vinylidene cyanide, vinyl propionate, maleic anhydride, or its esters and amides, methyl maleic anhydride, tetrafluoroethylene, etc.

Additional examples of copolymerizable comonomers are monomeric or partially polymerized vinyl esters, such as the acetate, propionate, etc.; vinyl ketones, methvinyl ketones, olefinic nitriles, such as acrylonitrile, methacrylonitrile, fumaryl nitrile, beta - cyano - ethylacrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, hydroxypropyl methacrylate, etc.; itaconic esters, for example, dimethyl itaconate, diethyl itaconate, diallyl itaconate; olefinic amides, for example, acrylamide, itaconamide, the maleic mono- and di-amides, and the corresponding imides, etc.; the vinyl ethers, for example, vinyl butyl ether, vinyl isobutyl ether, vinyl cyclohexyl ether, the dienes, etc., for example, butadiene, isoprene, dimethyl butadiene, etc.

In preparing copolymers of the telomerized polyamides with other polymerizable comonomers such as methyl methacrylate, acrylonitrile, and the like, the telomerized polyamides can constitute as little as 0.1 percent by weight of the whole, whereas in other cases, the telomerized polyamides alone can constitute as much as 98 to 99 percent of the whole. As in the case of the copolymers with unsaturated aliphatic alkyd resins, the proportion of the components in a particular formulation will depend upon the particular comonomers used and the particular properties desired in the copolymer. The polymers and copolymers can be prepared most readily by ionizing radiation.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, refers to parts by weight and percentages by weight.

EXAMPLE I

In a suitable apparatus equipped with a stirrer, reflux condenser, inert gas inlet, heating mantle, and thermostatic control for the reactor, are placed 12 parts of ethylene diamine and 39.2 parts of maleic acid anhydride. The apparatus is first deoxygenated by sweeping dry deoxygenated nitrogen through the apparatus and thereafter allowing a slow stream of nitrogen to pass through during the reaction. The mixture is heated to about 100° C. for about one hour to give a quantitative yield of

HOOCCH$_2$CH$_2$CONHCH$_2$CH$_2$NHOCCH$_2$CH$_2$COOH

Then 51.2 parts of glycidyl acrylate and 0.25 part of t-butyl catechol are added and the reaction continued for about two hours to give the telomerized oligomer:

This is a light-colored resinous product.

(b) When an equivalent amount of glycidyl methacrylate is substituted for the glycidyl acrylate the corresponding methacrylyl derivative is obtained.

(c) When an equivalent amount of glycidyl acetate is substituted for the glycidyl acrylate the corresponding acetyl derivative is obtained.

EXAMPLE II

The procedure of Example I is repeated ten times using respectively instead of the 39.2 parts of maleic acid anhydride:

(a) 46.4 parts of fumaric acid;
(b) 44.8 parts of itaconic acid anhydride;
(c) 44.8 parts of citraconic acid anhydride;
(d) 60.8 parts of 1.2-tetrahydrophthalic acid anhydride;
(e) 68.0 parts of 1,4-tetrahydrophthalic acid;
(f) 52.8 parts of mesaconic acid;
(g) 45.6 parts of acetylene dicarboxylic acid;
(h) 50.4 parts of alpha-methyl itaconic acid anhydride; and
(i) 91.2 parts of decenedioic acid;

and there are obtained the corresponding products in which the center

—OOCCH=CHCONHCH$_2$CH$_2$

NHOCCH=CHCONH— portion of the molecule is replaced respectively by:

(a') —OOCCH=CHCONHCH$_2$
CH$_2$NHOCCH=CHCOO—

(b') 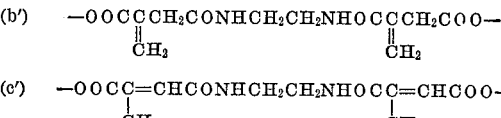

(c') 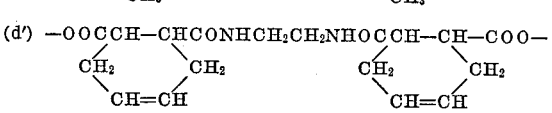

(d') 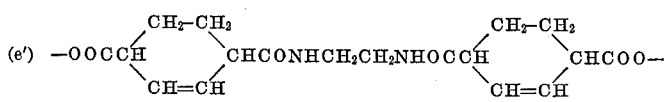

(e') 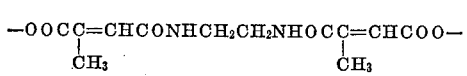

(f') 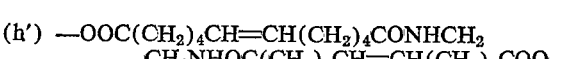

(g') —OOCC≡CCONHCH$_2$CH$_2$NHOCC≡CCOO— and (h') —OOC(CH$_2$)$_4$CH=CH(CH$_2$)$_4$CONHCH$_2$
CH$_2$NHOC(CH$_2$)$_4$CH=CH(CH$_2$)$_4$COO—

EXAMPLE III

The procedure of Example I is repeated six times using respectively instead of the 12 parts of ethylene diamine:

(a) 14.8 parts of trimethylene diamine;
(b) 28.8 parts of hexamethylene diamine;
(c) 34.4 parts of octamethylene diamine;
(d) 40.0 parts of 2,9-diaminodecane;
(e) 12.1 parts of ethanolamine;
(f) 17.8 parts of 4-amino-butanol-1;

(a) CH$_2$=CHCOOCH$_2$CHCH$_2$OOCCH=CHCONHCH$_2$CH$_2$NHOCCH=CHCOOCH$_2$
    |                                                                    |
    OH                                              CH$_2$=CHCOOCH$_2$CH
                                                                        |
                                                                        OH and there are obtained respectively:

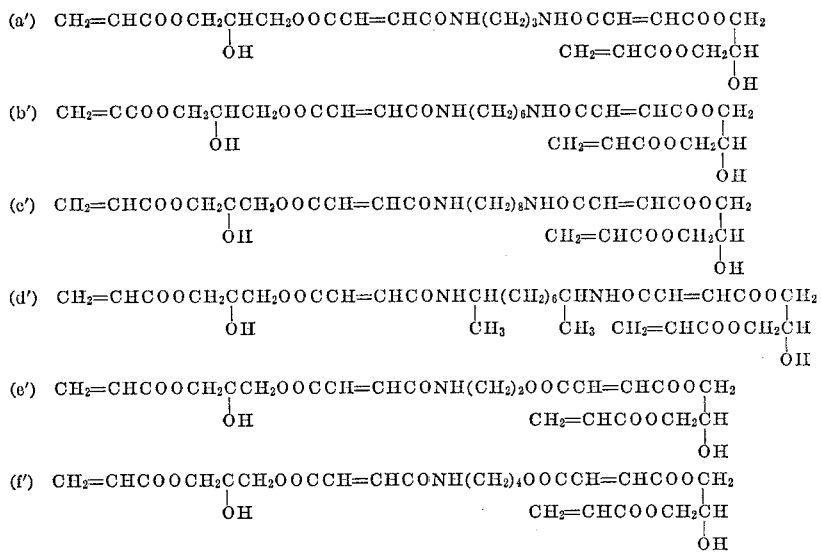

Similar results are also obtained with equivalent amounts of 2,3-diamino-butane, decamethylene diamine, 2,2-diethyl-propane-diamine-1,3, diethylene triamine, 1,4-diaminocyclohexane, 1,2 - diaminocyclohexane, 1,4 - bis(aminomethyl)cyclohexane, etc.

EXAMPLE IV

To the reactor of Example I there is added 24 parts of ethylene diamine and 49 parts of maleic anhydride, and the mixture reacted at 180° C. for six hours or until titration of a sample with 1 N sodium hydroxide shows that it is substantially $$HOOC(CH_2)_2[CONHCH=CHNHOC(CH_2)_2]_4COOH$$

Then there is added 25.6 parts of glycidyl acrylate and

0.25 parts of t-butyl catechol and the reaction continued for another two hours to give the polymer:

CH₂=CHCOOCH₂CHCH₂OOCCH=CHCO[NHCH₂CH₂NHOCCH=CHCO]₄OCH₂
             |                                                                               CH₂=CHCOOCH₂CH
            OH                                                                                |
                                                                                                                            OH

EXAMPLE V

The procedure of Example IV is used except that 60 parts of ethylene diamine and 107.8 parts of maleic anhydride are used instead of 24 parts and 49 parts respectively, and there is obtained

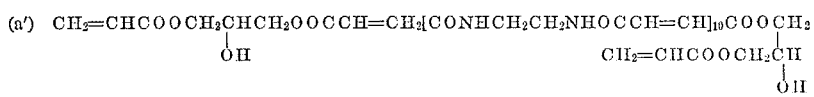

In a similar way by using 72 parts of ethylene diamine and 127.40 parts of maleic anhydride, there is obtained

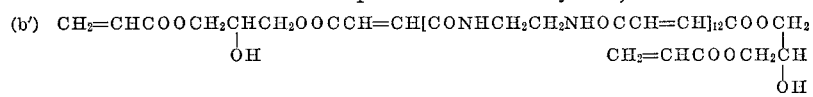

With 84 parts of ethylene diamine and 147 parts of succinic anhydride there is obtained

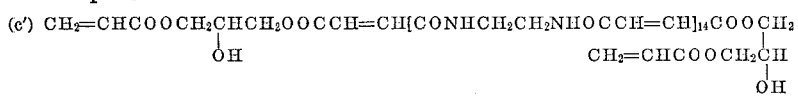

EXAMPLE VI

A mixture of 512 parts of the product of Example I, 204 parts of acetic anhydride and 1 part of tributyl amine are refluxed in a nitrogen atmosphere for one hour. Then the acetic acid by-product is removed by distillation under a reduced pressure of 5 mm. and there remains in the reaction flask 592 parts of the product

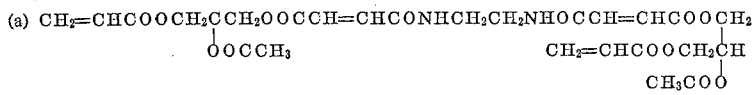

When the above procedure is repeated with equivalent amounts of the products of Examples II–V the corresponding diacetyl derivatives are obtained.

EXAMPLE VII

The procedure of Example VI is repeated except that instead of acetic anhydride there is used 252 parts of acrylic anhydride containing 1% of tributyl amine, and there is obtained

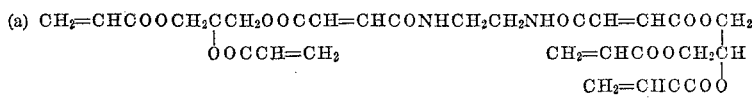

17

When the above procedure is repeated with equivalent amounts of the products of Examples II–V the corresponding tetraacrylyl derivatives are obtained.

EXAMPLE VIII

By repeating the procedure of Examples VI and VII a number of times using molar equivalents respectively of the appropriate anhydrides, namely, methacrylic, stearic, methoxy acetic, acrylic and butyric anhydrides, the corresponding ester products are obtained.

EXAMPLE IX

To the reactor of Example I there are added, in a number of respective experiments, appropriate proportions of ethylene diamine and maleic anhydride and reacted at 180° C. for six hours to give a series of products having the general formula HOOCCH=CHCO[NHCH$_2$CH$_2$NHOCCH=CHCO]$_n$OH wherein $n$ equals 1, 3, 5, 10, 12, 14 and 15. These are in turn each reacted with two molar proportions of glycidyl methacrylate to give seven products respectively of the general formula

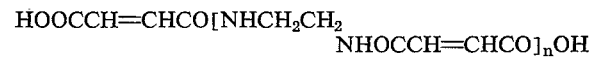

where $n=1$ for sample (a′)
$n=3$ for sample (b′)
$n=5$ for sample (c′)
$n=10$ for sample (d′)
$n=12$ for sample (e′)
$n=14$ for sample (f′)
$n=15$ for sample (g′)

EXAMPLE X

The procedure of Example IX is repeated a number of times using molar equivalents of glycidyl acrylate instead of glycidyl methacrylate, and there are obtained seven products of the general formula

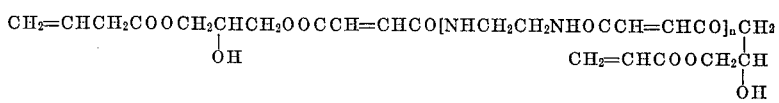

where $n=1$ for sample (a′)
$n=3$ for sample (b′)
$n=5$ for sample (c′)
$n=10$ for sample (d′)
$n=12$ for sample (e′)
$n=14$ for sample (f′)
$n=15$ for sample (g′)

18

EXAMPLE XI

The seven products of Example IX, (a′) to (g′) inclusive, are treated with acetic anhydride by the procedure of Example VI and there are obtained the acetyl derivatives of the general formula (a) 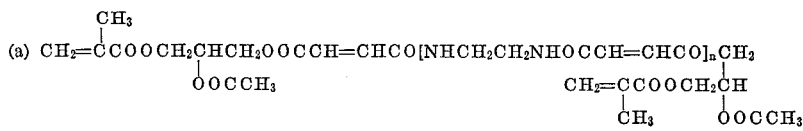

and when acrylic anhydride is used as the acrylating agent according to Example VII, there are obtained the respective products (b) 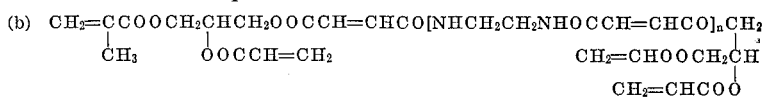

with the values of $n$ corresponding in each case to those of Example IX, where $n$ has the original numerical value of 1 to 15.

EXAMPLE XII

When in Example IX other unsaturated aliphatic dicarboxylic acids, such as itaconic, citraconic, mesaconic, 1,2-tetrahydrophthalic, etc., are used instead of maleic anhydride, the corresponding hydroxy-substituted diacrylyl terminated polyamides are obtained. These hydroxy-substituted polyamides are readily acrylated by the procedures of VI, VII and VIII.

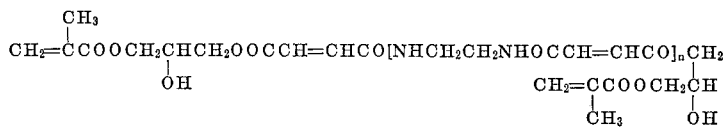

EXAMPLE XIII

The procedure of Example IX is repeated a number of times using equivalent quantities of an aromatic dicarboxylic acid, phthalic anhydride, instead of the aliphatic dicarboxylic succinic anhydride, and there is obtained a series of products of the general formula

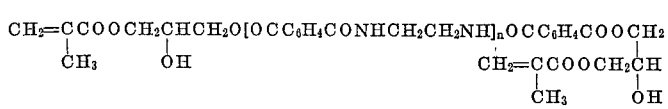

$n=1$ in sample (a′)
$n=5$ in sample (b′)
$n=10$ in sample (c′)
$n=12$ in sample (d′)

EXAMPLE XIV

The procedure of Example IX is repeated using equivalent quantities of an aromatic diamine p-xylylidene diamine, NH$_2$CH$_2$C$_6$H$_4$CH$_2$NH$_2$ instead of ethylene diamine, and there is obtained a series of products of the general formula

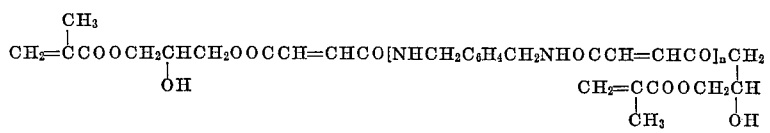

in which $n=1$ in sample (a')
$n=5$ in sample (b')
$n=10$ in sample (c')
$n=15$ in sample (d')

EXAMPLE XV

The telomerized hydroxy-substituted polyamides of Example I, II and the acyl-substituted polyamide of Example VI are irradiated in an aluminum dish while exposed to air and they crosslink at 2.0, 2.1 and 2.0 megarads respectively.

The telomerized diacrylyl polyamides of Example VIII are similarly irradiated; they become insoluble and infusible at dosages in the range of 2.2 to 3.1 megarads.

EXAMPLE XVI

The tetraacrylyl-substituted polyamides of Examples VII and VIII are irradiated in an open container. These crosslink at irradiation dosages within the range of 0.90 to 1.4 megarads, indicating the extra sensitivity introduced into the diacrylyl telomerized polyamide by the introduction of two additional acrylyl groups.

EXAMPLE XVII

The seven telomerized polyamides of Example IX are subjected to irradiation. Those having values of $n$ from 1 to 14 crosslink under dosages increasing from 2 megarads for $n=1$ to 4.6 megarads for $n=14$. For $n=15$, crosslinking occurs at 6.7 megarads, indicating an economical upper limit for values of $n$ being less than 15. When however, an average value of less than 15 can be obtained by mixtures of polyamides of $n$ being smaller than 15, for example $n=1$ to 12 with a polyamide of $n=15$, for example equal mixtures of amides of $n=15$ with amides of $n=1$ and 5 respectively, crosslinking occurs at 3.1 and 4.2 megarads respectively.

Irradiation of the telomerized samples $X(a')$ to $X(g')$ and $XI(a)$ inclusive shows similar results, indicating that $n=14$ is an economical upper limit.

EXAMPLE XVIII

The seven tetraacrylyl polyamides of Example XI(b) are submitted to irradiation of the linear accelerator and all of them crosslink in the range of 1 to 3.2 megarads indicating the marked effect of the additional acrylyl groups which not only lowers the dosage requirements but also raises the upper limit of the value of $n$. The products vary from hard, tough, insoluble, infusible solids at $n=1$ to tough, infusible, insoluble, progressively more elastic polymers at $n=15$.

EXAMPLE XIX

A cellulose sponge is impregnated with the telomerized polyamide of Example IX(a') dissolved in an equal weight of acetone so that after evaporation of the acetone at 25° C., the sponge contains 18% by weight of the polyamide. On irradiation there is obtained a tough, rigid structural member of low density.

EXAMPLE XX

A printed face sheet whose design corresponds to that of a wood grain is impregnated with a mixture of the telomerized polyamide, (1) IX(a'), 50 parts; (2) IX(c'), 20 parts; (3) IX(d'), 10 parts; and (4) XI(b) where $n=2$, 5 parts, and alkyd resin G, 15 parts; so that the sheet consists of 60 parts of polyamide mixture and 40 parts of sheet by weight. This impregnated sheet is laid over a woodchip board and the whole irradiated to 4 megarads. There is obtained a finished board having the appearance of a fine grain, high gloss, varnished wood which is resistant to water, alcohol, acetone and most of the common organic solvents.

EXAMPLE XXI

| | Parts |
|---|---|
| Alkyd resin A | 80 |
| Telomerized polyamide Example III | 20 |

The alkyd resin A and the telomerized polyamide are thoroughly and uniformly mixed and subjected to ionizing radiation and converted to an insoluble, infusible hard product at a dose of 3.6 megarads.

Fillers such as wood flour, alpha cellulose, shredded cellulose derivatives, asbestos, paper, cloth, sand, silica, calcium sulfate, etc., can be coated or impregnated with the mixture and the mass hardened by irradiation to produce formed articles of good appearance and excellent physical properties and improved heat-resistance.

To improve the heat-resistance further the foregoing procedure is modified using a higher ratio of telomerized polyamide to the unsaturated alkyd as follows:

| | Parts |
|---|---|
| Alkyd resin A | 50 |
| Telomerized polyamide VI | 50 | and

| | Parts |
|---|---|
| Alkyd resin A | 75 |
| Telomerized polyamide VI | 25 |

Compositions of the kind illustrated in this example have the advantage that they do not contain radical initiators and can be stored for long periods of time, and still are readily cured without the addition of catalyst by the simple expedient of subjecting them to irradiation.

EXAMPLE XXII

The procedure of Example XXI is repeated except that instead of Alkyd resin A, there is used Alkyd resin B and infusibility and insolubility is obtained at 3–4 megarads of irradiation.

The compositions of Example XXI and XXII can be used at room temperature, low pressure laminating resins for the preparation of reinforced laminates from glass mats or fabrics.

It will be understood of course that this invention is not limited to the interpolymerization of Alkyd resins A and B with the telomerized polyamide of Example VI, and that another acrylyl telomerized polyamide alone or in combination can be used, for example, the telomerized polyamides of Examples I, II and VII–XII inclusive, can also be used.

In contrast, when the aromatic containing telomerized polyamides of Examples XIII and XIV are used, irradiation doses in excess of 18 megarads are required to produce hard, infusible polymers.

Similarly, high irradiation doses in excess of 16 megarads are required when the aromatic containing alkyd resin J is used with the acrylyl telomerized polyamides in contrast to the use of alkyd resins C, D, E, F, H and I which become more infusible and insoluble in the range of 3.8 to 4.0 megarads.

The use of unsaturated alkyd resin G, which is an acrylyl terminated unsaturated alkyd in admixtures with the acrylyl telomerized aliphatic type polyamides, for example, the polyamides of Example I, II, and VI are particularly beneficial since in all cases crosslinking occurs within the range of 1.8 to 2.1 megarads.

EXAMPLE XXIII

A smoothly sanded pineboard 12 inches long by 36 inches and ⅝-inch thick is coated on one surface with a mixture of equal parts of the polyamides of Example XI to produce a layer of polyamide 0.005-inch in thickness, and the board is progressed under the sweeping beam of the linear accelerator to be given a uniform dose of 3 megarads. The finished board has the appearance of a high glass varnished lumber.

When the above polyamide mixture is blended and milled with 60 parts of titanium dioxide pigment (paint grade) and the pigmented polyamide applied to wood, fiber board or concrete block, a porcelainized finish is obtained when the coating is irradiated.

EXAMPLE XXIV

Fifty parts of the telomerized polyamide of Example XI(a) is diluted with 10 parts of glycol dimethacrylate and a concrete panel ⅛-inch thick is impregnated with this solution and the panel irradiated to a dosage of 3.5 megarads; a water-impervious panel is obtained.

EXAMPLE XXV

A mixture of 80 parts of exploded wood fibers of the type used to prepare fiber board, 12 parts of the telomerized polyamide of Example XIII(b), 1 part of zinc stearate and seven parts of linseed oil are milled to uniformity, pressed into a board and given 4.8 megarads of irradiation. There is obtained a well knit hard board which is readily paintable with either solvent-type paints, or aqueous emulsion paints.

EXAMPLE XXVI

Four parts of the polymer of Example IX(e') are added to 10 parts of water containing 0.5% of sodium dioctyl sulfosuccinate as an emulsifying agent and the mixture emulsified in a colloidal mill. The emulsion of the telomerized polyamide is added to 50 parts of prepuffed polystyrene beads mixed and the mixture tumbled until all the beads are uniformly coated. The water is then allowed to evaporate from the coated foamed beads which adhere slightly to each other. The coated foamed beads are then placed in a container such as a card-board box and irradiated to a dose of about 4 megarads. By this process there is obtained a foamed structure in which the beads are all bonded with infusible bonds to each other, the shape of which conforms to the form of the container.

EXAMPLE XXVII

A uniform mixture of 40 parts of the diacrylyl polyamide of Example IX(a') and 60 parts of a plastisol grade of polyvinylchloride having a molecular weight of about 25,000 is prepared. This is melt-extruded into pipe and given an irradiation dose of 3 megarads. The polyvinylchloride is not degraded by this small dosage and the treatment makes the pipe insoluble and infusible so that it withstands hot water 210° F. and hot saturated brine at 215° F. without softening. It also withstands hot solutions of acetic acid, toluene, carbon tetrachloride, etc.

EXAMPLE XXVIII

Ninety parts of powdered nylon 66 and 10 parts of telomerized polyamide Example IV are thoroughly and uniformly mixed and then melt-extruded into a thin sheet. This sheet is subjected to ionizing radiation. A tough product of improved softening point is produced at 3.5 megarads. Exposure to a dose of 8 megarads produces only a slightly harder product.

To improve the heat resistance further the foregoing procedure is modified using a higher ratio of the telomerized polyamide to the nylon 66 as follows:

| | Parts |
|---|---|
| Nylon 66 | 80 |
| Telomerized polyamide | 20 | and

| | Parts |
|---|---|
| Nylon 66 | 75 |
| Telomerized polyamide | 25 |

Compositions of the kind illustrated in this example have the advantage that they do not contain radical initiators and can be stored for long periods of time, and still are readily cured without the addition of catalyst by the simple expedient of subjecting them to irradiation. The foregoing procedure is repeated with similar results using as the diacrylyl polyamide the respective telomerized polyamides of Examples I–IV and V–XII.

EXAMPLE XXIX

The procedure of Example XXVII is repeated except that instead of nylon 66, there is used polycaprolactamide, and infusibility and insolubility is obtained at 3–4 megarads of irradiation.

In contrast, when the aromatic containing telomerized polyamides of Examples XIII and XIV and the acetyl telomerized polyamide of Example I(c) are used in Examples XXVII and XXVIII irradiation doses in excess of 18 megarads are required to produce hard infusible polymers.

Other methods of combining or mixing the polyamide resins and the diacrylyl polyamides can be used. For example the polyamide resin and the telomerized polyamide can be dissolved in a mutual solvent, such as dimethylformamide and other solvents well known for nylon, and films laid therefrom which can be subsequently radiated.

While certain features of this invention have been described in detail with respect to various embodiments thereof, it will, of course, be apparent that other modifications can be made within the spirit and scope of this invention and it is not intended to limit the invention to the exact details shown above except as they are defined in the following claims.

The invention claimed is:

1. The highly radiation-sensitive telomerized diacrylyl polyamide having the formula $$CH_2=\overset{R''}{\underset{|}{C}}COOCH_2\underset{\underset{OX}{|}}{C}HCH_2OOCRCO[AR'AOCRCO]_nOCH_2\underset{\underset{OX}{|}}{C}HCH_2OOC\overset{R''}{\underset{|}{C}}=CH_2$$

Wherein $n$ has a value of 1–14;

A is a divalent radical selected from the class consisting of —O— and —NH—, there being at least one said —NH— radical per polyamide molecule;

R represents a connecting linkage between two adjacent carboxylic radicals selected from the class consisting of a single valence bond and a divalent aliphatic hydrocarbon radical having 2–10 carbon atoms, at least 75% of which R groups per polyamide molecule are unsaturated;

R' is a divalent aliphatic hydrocarbon radical having 2–10 carbon atoms;

R'' is a radical selected from the class consisting of hydrogen and methyl;

R'''' is a radical selected from the class consisting of hydrogen and aliphatic hydrocarbon radical having 1–18 carbon atoms; and X is a radical selected from the class consisting of hydrogen and an acyl radical of the formula R''''CO.

2. The telomerized diacrylyl polyamide of claim 1, which has the formula

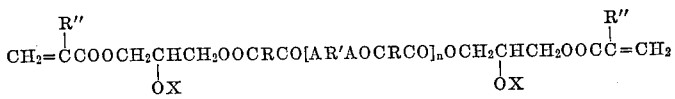

$$CH_2=CHCOOCH_2\underset{\underset{OH}{|}}{C}HCH_2OOCCH=CHCONHCH_2CH_2NHOCCH=CHCOOCH$$
$$CH_2=CHCOOCH_2\underset{\underset{OH}{|}}{C}H$$

3. The telomerized diacrylyl polyamide of claim 1, which has the formula $$CH_2=CHCOOCH_2CHCH_2OOCCH=CHCONHCH_2CH_2NHOCCH=CHCOOCH_2$$
$$\qquad\qquad\quad\overset{|}{OOCCH=CH_2} \qquad\qquad\qquad\qquad\qquad CH_2=CHCOOCH_2\overset{|}{C}H$$
$$\qquad\qquad\qquad\qquad\qquad\qquad\qquad\qquad\qquad\qquad\qquad\overset{|}{CH_2=CHCOO}$$

4. The telomerized diacrylyl polyamide of claim 1, which has the formula $$CH_2=CHCOOCH_2CHCH_2OOCC CHCO[NHCH_2CH_2NHOCC CHCO]_nOCH_2$$
$$\qquad\qquad\quad\overset{|}{OH}\quad\overset{\|}{CH_2}\qquad\qquad\qquad\overset{\|}{CH_2}\qquad\qquad\quad |$$
$$\qquad\qquad\qquad\qquad\qquad\qquad\qquad\qquad\qquad CH_2=CHCOOCH_2CH$$
$$\qquad\qquad\qquad\qquad\qquad\qquad\qquad\qquad\qquad\qquad\qquad\overset{|}{OH}$$

5. The telomerized diacrylyl polyamide of claim 1, which has the formula $$CH_2=CHCOOCH_2CHCH_2OOCCH-CH-CO[NHCH_2CH_2NHOCCH-CH-CO]_nOCH_2$$
$$\quad\overset{|}{OH}\quad C\overset{/}{H_2}\,\overset{\backslash}{CH_2}\qquad\qquad\qquad CH_2\,CH_2 \qquad |$$
$$\qquad\qquad\quad\backslash CH=CH/\qquad\qquad\qquad\backslash CH=CH/\qquad CH_2=CHCOOCH_2CH$$
$$\qquad\qquad\qquad\qquad\qquad\qquad\qquad\qquad\qquad\qquad\overset{|}{OH}$$

6. The telomerized diacrylyl polyamide of claim 1, which has the formula $$CH_2=CHCOOCH_2CHCH_2OOCC=CHCO[NHCH_2CH_2NHOCC=CHCO]_nOCH_2$$
$$\qquad\qquad\quad\overset{|}{OH}\quad\overset{|}{CH_3}\qquad\qquad\qquad\overset{|}{CH_3}\qquad\qquad |$$
$$\qquad\qquad\qquad\qquad\qquad\qquad\qquad\qquad\qquad CH_2=CHCOOCH_2CH$$
$$\qquad\qquad\qquad\qquad\qquad\qquad\qquad\qquad\qquad\qquad\overset{|}{OH}$$

7. A process for producing an improved polyamide resin composition comprising the treatment with at least about 0.5 megarad and no more than about 10 megarads of high energy, ionizing radiation equivalent to at least 100,000-electron volts, of a highly radiation-sensitive telomerized diacrylyl polyamide having the formula $$\qquad\qquad R'' \qquad\qquad\qquad\qquad\qquad\qquad\qquad\qquad R''$$
$$CH_2=\overset{|}{C}COOCH_2CHCH_2OCCRCO[AR'AOCRCO]_nOCH_2CHCH_2OC\overset{|}{C}=CH_2$$
$$\qquad\qquad\overset{|}{OX}\qquad\qquad\qquad\qquad\qquad\qquad\qquad\qquad\overset{|}{OX}$$

Wherein $n$ has a value of 1–14;

A is a divalent radical selected from the class consisting of —O— and —NH—, there being at least one said —NH— radical per polyamide molecule;

R represents a divalent saturated aliphatic hydrocarbon radical having 2–10 carbon atoms, at least 75% of said R groups per polyamide molecule being unsaturated;

R′ is a divalent saturated aliphatic hydrocarbon radical having 2–10 carbon atoms;

R″ is a radical selected from the class consisting of hydrogen and methyl;

R″″ is a radical selected from the class consisting of hydrogen and aliphatic hydrocarbon radical having 1–18 carbon atoms; and X is a radical selected from the class consisting of hydrogen and an acyl radical of the formula R″″CO.

8. The process of claim 7 in which said diacrylyl polyamide is in intimate admixture with a polyamide resin consisting essentially of a plurality of repeating units having a formula selected from the class consisting of —R″″CONH— and —R″″NHOCR″″CONH— wherein R″″ is a divalent saturated aliphatic hydrocarbon radical of 4–8 carbon atoms having at least 4 carbon atoms in the linear chain between the two valencies and having a molecular weight of at least 500, said polyamide resin comprising 10–70 percent by weight of the resultant mixture and said diacrylyl polyamide comprising 30–90 percent by weight of the resultant mixture.

9. The process of claim 7 in which said diacrylyl polyamide is intimately admixed with a copolymerizable monomer, said diacrylyl polyamide comprising 1–99 percent by weight of said copolymerizable mass and said copolymerizable monomer comprising 99–1 percent by weight of said copolymerizable mass.

10. The process of claim 7 in which said diacrylyl polyamide is in intimate admixture with an unsaturated aliphatic alkyd resin, said diacrylyl polyamide comprising 10–70 percent by weight of said copolymerizable mass and said unsaturated aliphatic alkyd resin comprising about 30–90 percent by weight of said copolymerizable mass.

11. The process of claim 7 in which said diacrylyl polyamide has the formula $$CH_2=CHCOOCH_2CHCH_2OOCCH=CHCONHCH_2CH_2NHOCCH=CHCOOCH_2$$
$$\qquad\qquad\quad\overset{|}{OH}\qquad\qquad\qquad\qquad\qquad\qquad\qquad CH_2=CHCOOCH_2\overset{|}{C}H$$
$$\qquad\qquad\qquad\qquad\qquad\qquad\qquad\qquad\qquad\qquad\qquad\overset{|}{OH}$$

12. The process of claim 7 in which said diacrylyl polyamide has the formula $$CH_2=CHCOOCH_2CHCH_2OOCCH=CHCONHCH_2CH_2NHOCCH=CHCOOCH$$
$$\qquad\qquad\quad\overset{|}{OOCCH=CH_2}\qquad\qquad\qquad\qquad\qquad CH_2=CHCOOCH_2\overset{|}{C}H$$
$$\qquad\qquad\qquad\qquad\qquad\qquad\qquad\qquad\qquad\qquad\qquad\overset{|}{CH_2=CHCOO}$$

13. The process of claim 7 in which said diacrylyl polyamide has the formula $$CH_2=CHCOOCH_2CHCH_2OOCCH=CHCO[NHCH_2CH_2NHOCCH=CHCO]_nOCH_2$$
$$\qquad\qquad\quad\overset{|}{OH}\qquad\qquad\qquad\qquad\qquad\qquad\qquad CH_2=CHCOOCH_2CH$$
$$\qquad\qquad\qquad\qquad\qquad\qquad\qquad\qquad\qquad\qquad\qquad\overset{|}{OH}$$

14. The process of claim 7 in which said diacrylyl polyamide has the formula

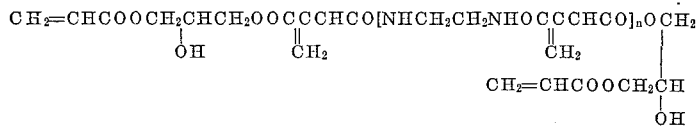

15. The process of claim 6 in which said diacrylyl polyamide has the formula

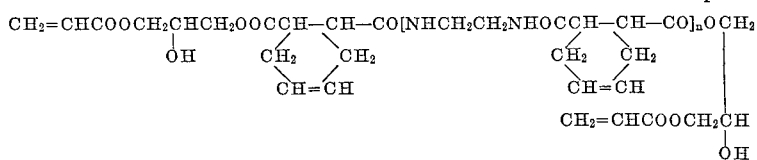

16. A radiated polymeric product produced according to the process of claim 7.

17. A radiated polymeric product produced according to the process of claim 8.

18. A radiated polymeric product produced according to the process of claim 9.

19. A radiated polymeric product produced according to the process of claim 10.

20. A radiated polymeric product produced according to the process of claim 11.

21. A radiated polymeric product produced according to the process of claim 12.

22. A radiated polymeric product produced according to the process of claim 13.

23. A radiated polymeric product produced according to the process of claim 14.

24. A process for producing an improved polyamide resin composition comprising the treatment with at least about 0.5 megarad of high energy, ionizing radiation equivalent to at least 100,000 electron volts, of a highly radiation-sensitive telomerized diacrylyl polyamide having the formula:

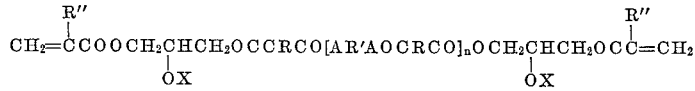

wherein $n$ has a value of 1–14;

A is a divalent radical selected from the class consisting of —O— and —NH—, there being at least one said —NH— radical per polyamide molecule;

R represents a divalent saturated aliphatic hydrocarbon radical having 2–10 carbon atoms, at least 75 percent of said R groups per polyamide molecule being unsaturated;

R' is a divalent saturated aliphatic hydrocarbon radical having 2–10 carbon atoms;

R" is a radical selected from the class consisting of hydrogen and methyl;

R'''' is a radical selected from the class consisting of hydrogen and aliphatic hydrocarbon radical having 1–18 carbon atoms; and X is a radical selected from the class consisting of hydrogen and an acyl radical of the formula R''''CO.

References Cited

UNITED STATES PATENTS 2,333,923  11/1943  Gray _____ 260—76
2,251,946  8/1941   Lott _____ 260—561

MURRAY TILLMAN, Primary Examiner

RICHARD B. TURER, Assistant Examiner

U.S. Cl. X.R.

117—123, 148, 161; 161—197; 204—159.19, 159.22; 260—2.5, 17.4, 40, 41, 75, 78, 485, 557, 561 857

PO-1050
(5/69)

UNITED STATES PATENT OFFICE
CERTIFICATE OF CORRECTION

Patent No. 3,483,105      Dated December 9, 1969

Inventor(s) Gaetano F. D'Alelio

It is certified that error appears in the above-identified patent and that said Letters Patent are hereby corrected as shown below:

In the caption after "PPG Industries, Inc." insert --Pittsburgh, Pennsylvania

Column 3, line 1

"Telemerized" should be --Telomerized--;

Columns 3 and 4, first line of formula

"¢COCl" should read --$_n$COCl--;

Column 3, line 56, last line of formula

"OOCRR" should be --OOCR''''--;

Column 4, line 25, last line of formula

"(Eq. 3)" should be ---(Eq. 4)---;

Column 14, line 17

"(d) 1.2" should read --(d) 1,2--;

Column 17, line 14, after "methoxy acetic" insert --acetic,---

Column 18, line 53 insert

--in which-- before n-1 in sample (a')

SIGNED AND
SEALED
AUG 18 1970

(SEAL)
Attest:

Edward M. Fletcher, Jr.
Attesting Officer

WILLIAM E. SCHUYLER, JR.
Commissioner of Patents